United States Patent
Houdard et al.

[11] 4,336,600
[45] Jun. 22, 1982

[54] BINARY WORD PROCESSING METHOD USING A HIGH-SPEED SEQUENTIAL ADDER

[75] Inventors: Jean-Pierre Houdard; Jean-Jacques Julié; Bernard G. Leoni, all of Colombes, France

[73] Assignee: Thomson-CSF, Paris, France

[21] Appl. No.: 138,893

[22] Filed: Apr. 10, 1980

[30] Foreign Application Priority Data

Apr. 12, 1979 [FR] France .............................. 79 09325

[51] Int. Cl.³ .............................................. G06F 7/50
[52] U.S. Cl. ..................................... 364/785; 364/786
[58] Field of Search .................................. 364/785, 786

[56] References Cited

U.S. PATENT DOCUMENTS

| | | | |
|---|---|---|---|
| 3,636,334 | 1/1972 | Svoboda | 364/786 |
| 3,711,692 | 1/1973 | Batcher | 364/786 |
| 3,723,715 | 3/1973 | Chen et al. | 364/786 |
| 3,941,990 | 3/1976 | Rabasse | 364/785 |

OTHER PUBLICATIONS

Kovvaras et al., "A Digital System of Simultaneous Addition of Several Binary Numbers", *IEEE Trans. on Computers*, Oct. 1968, pp. 992-997.

Cukrer et al., "Multiple Input Serial Adder Using Counter", *IBM Tech. Disclosure Bulletin*, vol. 19, No. 11, Apr. 1977, pp. 4215-4216.

*Primary Examiner*—David H. Malzahn
*Attorney, Agent, or Firm*—Oblon, Fisher, Spivak, McClelland & Maier

[57] ABSTRACT

The words to be added together by the high-speed sequential adder are stored in shift registers $1_1$ to $1_p$ whose serial outputs are connected to the corresponding inputs of a transcoder 2 producing the binary number of "1's" for each bit weight of the words to be added. This value is sent to an adder-divider 4 which adds it to the number of carried "1's" from the immediately lesser weight and divides this sum by 2, sending the fractional part of this half-sum to an output register 5 and the whole-number part to a carry register.

Application: digital filters for PCM telephone switching.

5 Claims, 2 Drawing Figures

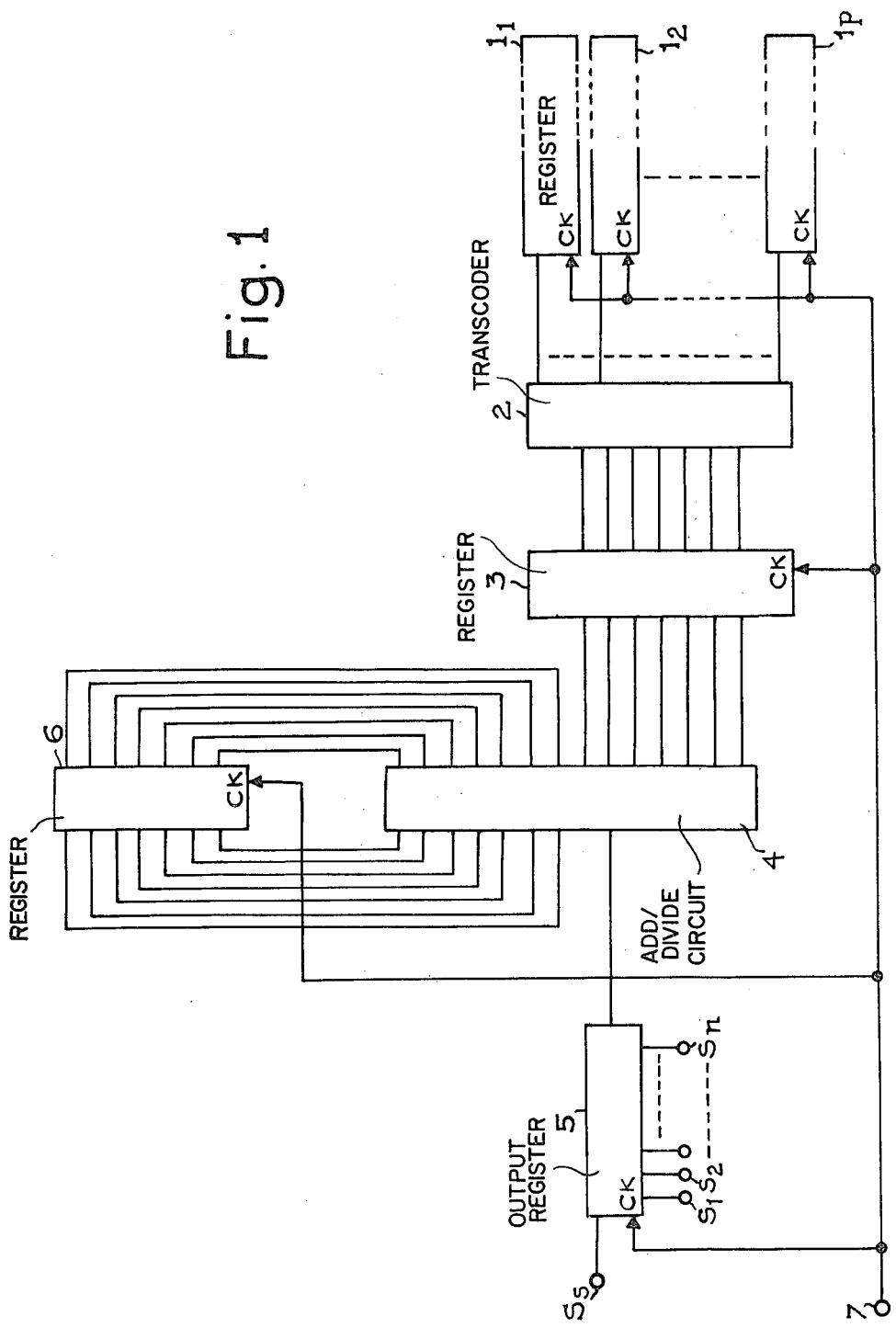

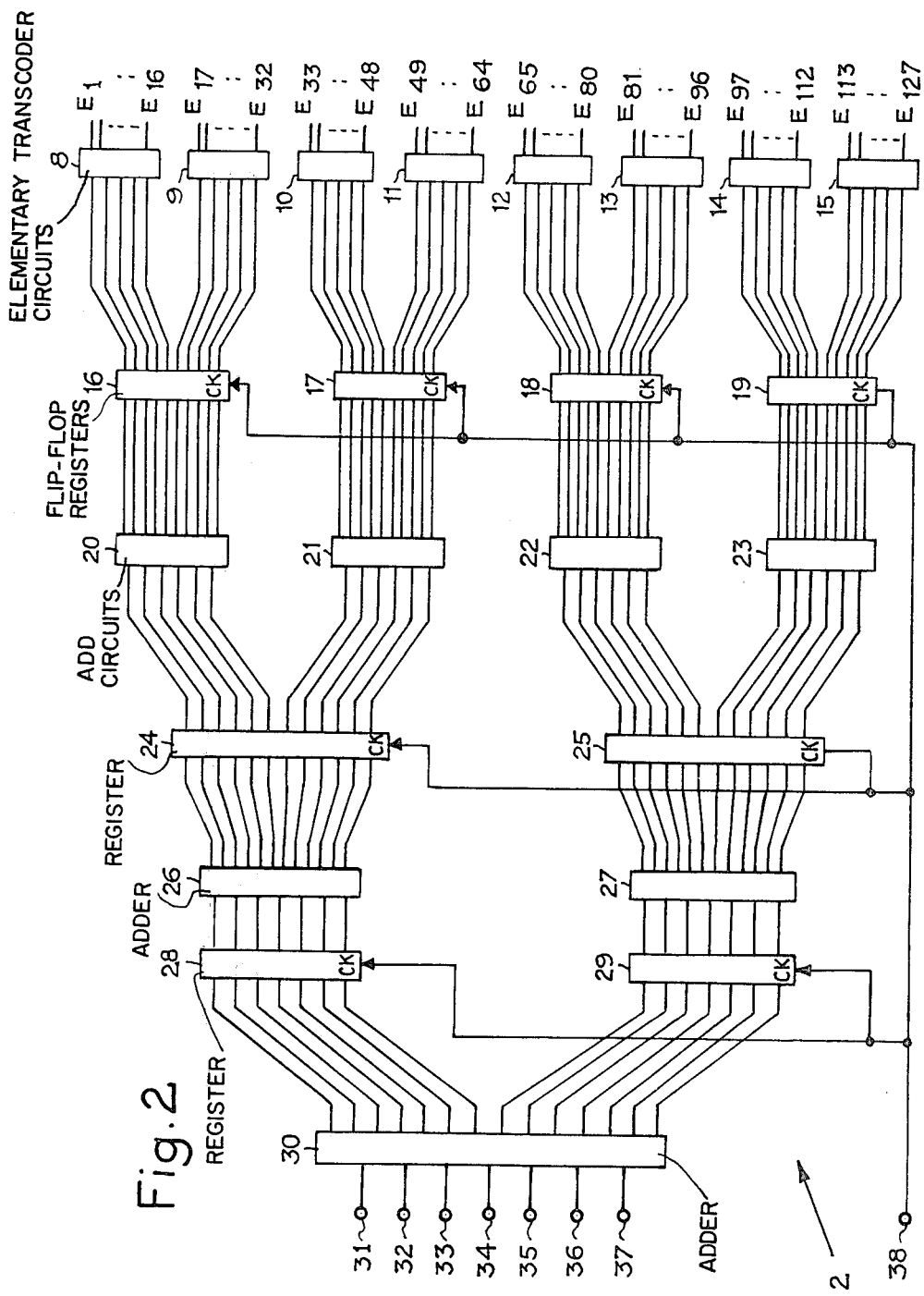

BINARY WORD PROCESSING METHOD USING A HIGH-SPEED SEQUENTIAL ADDER

BACKGROUND OF THE INVENTION

1. Field of the Invention

The present invention relates to a high-speed binary word processing method for the simultaneous adding of words, and to a high-speed adding device embodying the method.

2. Description of the Prior Art

The digital adders presently used for adding several binary numbers, each possessing a large number of bits, comprise a cascade of add cells each performing three-variable Boolean functions, the carry propagating from cell to cell, thereby requiring a relatively long execution time. In order to reduce the delay due to carry propagation, additional circuits are used to provide an anticipated carry. The size of such adders, however, becomes prohibitive when the format of the binary words to be added increases.

In many applications of adders, such as for digital filters, Fourier transform operators, or real-time digital correlators, it is necessary to perform a large number of additions in a short time, for example approximately 65 million additions per second on 16-bit words for certain types of transversal digital filters. In such cases, even high-speed adders with anticipated carry are no longer suitable.

The purpose of the present invention is to propose a binary word processing method allowing the simultaneous addition of a large number of words composed of a large number of bits in the shortest possible time with presently available means, as well as to propose an adder device for embodying the method.

SUMMARY OF THE INVENTION

The processing method in accordance with the present invention consists, from words stored in individual shift registers and extracted on the serial outputs of said registers, consists of extracting sequentially all bits having the same weight, starting with the least significant bits and progressing in increasing order to the most significant bits, of determining each time the number of "1's" amongst all bits of a given weight, of adding for each bit weight considered the number of carry "1's" relating to the bits of immediately lesser weight, of calculating the half-sum of these two numbers, of sending a "1" to the shift register when this half-sum is not a whole number or a "0" when it is a whole number, of memorizing a number equal to the whole part of this half-sum, and of extracting this whole number as so many carried "1's" used when calculating the following half-sum.

The device embodying the method proposed by the present invention comprises a transcoder device whose different inputs are connected to the serial outputs of different shift registers in which are stored the words to be added together, this transcoder device being arranged to present on its output in pure binary form the number of "1's" present on its inputs, the outputs of this transcoding device being connected via a bistable flip-flop register to the inputs of corresponding binary weights of a parallel-bit add-divide circuit itself connected to a register memorizing the sum of the carries, the least significant bit output of this add-divide circuit being connected to the serial input of an output shift register.

According to one particular practical form of the device proposed by the present invention for adding a large number of words, for example more than 16, the transcoder device has a pyramidal structure with several processing stages, the input stage at the base of the pyramid comprising in parallel several elementary transcoder circuits each producing on its different outputs in pure binary form the number of "1's" for each binary weight of all the words applied to all its inputs, the outputs of at least two different transcoder circuits being grouped each time on the input of an add circuit presenting on its outputs the sum of the input values, several stages of such add circuits being arranged in cascade, each of these stages comprising a number of add circuits less than that of the previous stage, for example half, the last stage at the top of the pyramid comprising only one add circuit. The different successive stages constituting the transcoder device are preferably interconnected by bistable flip-flop registers with parallel inputs and outputs, all these registers being connected to a common clock signal generator.

BRIEF DESCRIPTION OF THE DRAWINGS

The present invention may be more easily understood from the detailed description of an illustrative embodiment taken as a non-limitative example and illustrated by the appended drawing in which:

FIG. 1 is a general block diagram of a high-speed adder in accordance with the present invention, and FIG. 2 is a detailed circuit diagram of the transcoder device illustrated by FIG. 1.

DETAILED DESCRIPTION OF THE PREFERRED EMBODIMENT

The high-speed adder shown schematically in FIG. 1 is intended, for example, for the simultaneous addition of 127 words, each word comprising a large number of bits, for example 32. It should nevertheless be clearly understood that the number of words which can be added together may be different, and that said words may contain a different number of bits, the modifications to be made to the device in accordance with the invention being obvious to any person versed in the art after reading the present description.

The adder shown in FIG. 1 comprises on its input side p shift registers, designated $1_1$ to $1_p$, p being the number of words to be added together, this number being 127 in the present example, each of these registers comprising for example 32 cells if the maximum number n of bits of the words to be added is 32. The words to be added together may be entered into these shift registers in serial form or parallel form, depending on the configuration of the circuits coming before the adder.

The serial output of each register $1_1$ to $1_{127}$ is connected to a corresponding input of a transcoder 2 described in greater detail below. In the case of adding together 127 words, transcoder 2 comprises seven outputs of binary weights $2^0$ to $2^6$. The various outputs of transcoder 2 are connected via a register 3 to a series of corresponding inputs having the same weights of a binary add-divide circuit 4 which can, for example, be produced in a known manner by means of two type 74,283 integrated circuits supplied by Texas Instruments. Register 3 has parallel inputs and outputs and is composed, for example, in a conventional manner of eight type D bistable flip-flops, one of these cells not being used.

The least significant bit output of add-divide circuit 4 is connected to the serial input of a shift register 5 comprising a sufficient number of cells to contain all the bits of the result. In the above example of adding 127 words each containing 32 bits, it is easily shown that the result contains a maximum of 39 bits. Register 5 is therefore a standard 40-bit register.

The other outputs of the add-divide circuit 4 are connected to another series of its own inputs of corresponding weights via a register 6 having parallel inputs and outputs and of the same constitution as register 3.

The addition result may be obtained either on the serial output $S_S$ of register 5 during the actual execution of the operations described below, or on the parallel outputs $S_1$ to $S_n$ of register 5 following completion of said operations.

The shifting of bits in the shift registers $1_1$ to $1_p$ and 5, as well as the transit of bits through registers 3 and 6 are controlled by a clock signal applied to terminal 7, which is connected to the clocking input CK of all these registers.

FIG. 2 shows the detailed circuit diagram of the transcoder device 2 for adding together 127 words containing 32 bits each.

Transcoder 2 comprises on its input side a first stage of eight elementary transcoders numbered 8 to 15. These transcoder circuits may, for example, be 16-bit type 82S100 FPLA's (programmable logic arrays) supplied by Signetics, being programmed such that each produces in pure binary form on its five outputs the total number of "1's" present on all its inputs. The inputs of these transcoder circuits are designated $E_1$ to $E_{127}$, the last input of circuit 15 not being used.

The outputs of each pair of transcoder circuits are grouped and connected via type D bistable flip-flop registers 16 to 19 to the corresponding inputs of the four add circuits of a second processing stage, numbered 20 to 23 respectively. Each of these four add circuits produces on its outputs the sum of the two input values obtained from the two corresponding transcoder circuits. The outputs of the add circuits 20 to 23 are also grouped for each pair of adders and connected via two registers 24 and 25 to the corresponding inputs of two other adders 26 and 27 constituting the third processing stage, and finally the outputs of adders 26 and 27 are connected via two registers 28 and 29 to the corresponding inputs of an adder 30 constituting the last processing stage of the transcoder device and producing on its seven outputs 31 to 37 in pure binary form the total number of "1's" of a given weight which were simultaneously present on the 127 inputs $E_1$ to $E_{127}$.

The clocking signal inputs of all the registers are connected to a terminal 38, which is connected to terminal 7.

It may be seen that the configuration of the transcoder device shown in FIG. 2 is due to the use of elementary transcoder circuits 8 to 15, each possessing 16 inputs, which are the circuits having the highest performance presently available, and that if 128-input transcoder circuits were available, it is obvious that the device shown in FIG. 2 would be reduced to a single such circuit. The pyramidal structure in stages as described by the present invention could still be used, however, when it is required to add together a number of words exceeding the available number of transcoder circuit inputs. It may also be seen that the outputs of the transcoder circuits and add circuits can be grouped in a different asymmetrical manner provided the weights of the different outputs and inputs of the transcoder or add circuits are respected.

The different registers of the transcoder device 2 are not absolutely necessary, but it is preferable to use them in order to ensure synchronized operation of the various stages constituting this transcoder device.

The adder described above operates in the following manner: the words to be added together are stored in the input registers $1_1$ to $1_p$ (p being 127 in the above example), the least significant bit ($2^0$) of each of these words being available on the input of the transcoder device 2. The number of "1's" of weight $2^0$ present on the input is available in pure binary form on the outputs of each of the circuits 8 to 15. These values are transferred into adders 20 to 23 on the first rising edge of the clock signal applied to terminal 38 for addition in pairs. At the second rising edge of the clock signal, the four partial sums produced by adders 20 to 23 appear on adders 26 and 27, whose two partial sums appear on the last adder 30 on the third rising edge of the clock signal, adder 30 then producing in pure binary form on the input of register 3 the total number of "1's" of weight $2^0$ present on the input registers $1_1$ to $1_{127}$.

Said first edge of the clock signal not only transfers the results produced by transcoder circuits 8 to 15 for all the bits of weight $2^0$ of the words to be added into adders 20 to 23, but presents on inputs $E_1$ to $E_{127}$ the bits of weight $2^1$ which are processed in the same manner as bits of weight $2^0$, and so on up to bits of weight $2^{31}$.

The fourth rising edge of the clock signal transfers into adder-divider 4 the first useful contents of register 3, i.e. the total number of "1's" of weight $2^0$ of the words to be added. Adder-divider 4 adds this value to the output value of register 6, which is zero at the start of word addition, since there are not yet any carries, register 6 having been previously reset in an appropriate manner, and then starts shifting one step to the right (towards the lesser significant bits) of this value, i.e. it performs a divide-by-2 operation, and then sends register 5 the least significant bit following the shift operation, i.e. the fractional part ($2^{-1}$) of the divide result, and sends register 6 the other shifted bits. This means that adder 4 determines the half-sum of the total number of "1's" of the binary weight considered and the total number of carried "1's", sends the fractional part of this half-sum to register 5, and sends the whole-number part to the carry register 6.

On the fifth rising edge of the clock signal, the total number of bits of binary weight $2^1$ of the words to be added reached adder-divider 4 from adder 3, and at the same time register 6 sends to this same adder-divider the total number of carries relating to the bits of weight $2^0$. Adder-divider 4 determines the sum of these two values and then divides this sum by 2, sending the fractional part of the result to register 5 and the whole-number part of the result to register 6. This process continues in the same manner up to the thirty-fifth rising edge of the clock signal, which then orders the addition of the total number of "1's" of weight $2^{31}$ to the total number of carries relating to the "1's" of weight $2^{30}$, and then the division of this sum by 2, the transfer into register 5 of the least significant bit and the transfer into register 6 of the total number of carries. Thereafter, no more "1's" can reach register 3 in adder-divider 4 if it is assumed that no more words have been loaded into the input registers $1_1$ to $1_{127}$. Consequently, on the thirty-sixth rising edge of the clock signal, the carries only are transferred from register 6 to adder-divider 4. It may easily be shown that the maximum number of carried "1's" reaching adder-divider 4 from register 6 on the thirty-sixth rising edge is 126. Consequently, all the carried "1's" are exhausted at the latest following the forty-second rising edge of the clock signal. For example, if a 16 MHz clock is considered, i.e. a signal having a period of 62.5 nanoseconds, the addition of the 127 words, each containing 32 bits, is executed in approximately 2.6 microseconds, which is entirely compatible, for example, with the maximum allowable processing times for digital filters used in PCM telephone switching, and considerably less than the processing times of conventional adders having the same capacity.

In general, it may be easily shown that the addition of p words each comprising n bits is executed within a maximum period of $n+r+s$ clock signal periods where $2^r \leq p < 2^{r+1}$ and $$s = \log_2\left(\frac{2^{r+1}}{16}\right),$$

assuming that 16-input elementary transcoder circuits are used.

It is now shown by means of a simple example of binary addition that the operation of the adder in accordance with the present invention is correct. This example is limited to the addition of four five-bit words a, b, c and d, i.e. 11110, 01010, 01111 and 01111, corresponding to the decimal values 30, 10, 15 and 15 respectively. These four words are placed in the middle part of a table whose top part is reserved for the carries and whose bottom line is reserved for the result. The addition is performed in a known manner similar to that used for the pencil-and-paper addition of numbers in the decimal system.

| Bit weights | $2^7$ | $2^6$ | $2^5$ | $2^4$ | $2^3$ | $2^2$ | $2^1$ | $2^0$ |
|---|---|---|---|---|---|---|---|---|
| Carries | 0 | 1 | 1 | 1 | 1 | 1 | 1 | 0 |
|  | 0 | 0 | 1 | 1 | 1 | 1 | 0 | 0 |
|  | 0 | 0 | 0 | 1 | 0 | 0 | 0 | 0 |
| Words |  |  |  |  |  |  |  |  |
| a | 0 | 0 | 0 | 1 | 1 | 1 | 1 | 0 |
| b | 0 | 0 | 0 | 0 | 1 | 0 | 1 | 0 |
| c | 0 | 0 | 0 | 0 | 1 | 1 | 1 | 1 |
| d | 0 | 0 | 0 | 0 | 1 | 1 | 1 | 1 |
| Result | 0 | 1 | 0 | 0 | 0 | 1 | 1 | 0 |

In order to execute the addition, the four words a to d are written one beneath the other, bits of the same weight appearing in the same column, and then the columns are added one after another, starting with the least significant bits and transferring a carry into the column of the next higher weight each time two "1's" are added. For the column containing the weight $2^0$, there are two "1's" and naturally there is no carry from a previous column. A "0" is therefore written into the result line and a single carry is transferred into the column containing the bits of weight $2^1$.

In the column of weight $2^1$, four "1's" are found for the four words together with a carried "1", making a total of five "1's". Two "1's" are therefore carried into the column of weight $2^2$ and a "1" is written into the result line for column $2^1$. The process is the same for all the other columns, and the result 1000110 is obtained, i.e. the decimal value 70, which is obviously the sum of 30, 10, 15 and 15.

When analyzing this method of addition, it is seen that in each column the result bit is "0" when the number of "1's" of the words and the carries is even, and is "1" when this number is odd, and also that the number of carried "1's" is equal to half the number of "1's" of the previous column when this number is even or is equal to half of the immediately lesser number when the number of "1's" is odd, meaning that the number of carried "1's" is equal to the whole part of half of the number of "1's" for the words and carries from the previous column, and that the result bit is equal to the fractional part of this half. It may be easily verified that this rule is valid in all cases. Consequently, the binary word processing method described above effectively produces the sum of such words, and the device embodying this process operates correctly.

Although the principles of the present invention are described above in relation to specific illustrative embodiments, it should be clearly understood that said description is given as an example only and does limit the scope of the invention.

What is claimed is:

1. An adding device for simultaneously adding a large number of words with each of said words being stored in an individual shift register and extracted on the serial output of said register, said device comprising:
   a transcoder device whose inputs are connected to the serial outputs of the plurality of said individual shift registers in which are stored said words to be added together, wherein said transcoder device is connected in order to present pure binary form outputs indicating the number of "one's" present on its input;
   a bistable flip-flop register connected to the output of said transcoder device;
   a parallel-bit add-divide circuit whose binary weight inputs are connected to the output of said flip-flop register.
   a separate shift register connected to the least significant bit output of said add-divide circuit;
   second separate register connected to the remaining outputs of said add-divide circuit which outputs a series of signals to correspondingly weighted inputs of said add-divide circuit, wherein said add-divide circuit calculates the half-sum of its inputs and provides a "one" output to said first separate register when said half-sum is not a whole number and wherein said add-divide circuit provides an output equal to the number of the whole part of said half-sum to said second separate register which represents the number of carried "one's" for use when calculating a subsequent half-sum.

2. An adding device in accordance with claim 10, wherein the transcoder device has a pyramidal structure with several processing stages, the input stage at the base of the pyramid comprising in parallel several elementary transcoder circuits each producing in pure binary form on its different outputs the number of "1's" for each binary weight of all the words applied to all its inputs, the outputs of at least two different transcoder circuits being grouped each time on the input of an add circuit, several stages of such add circuits being arranged in cascade, the last stage at the top of the pyramid comprising only one add circuit.

3. An adding device in accordance with claim 2, wherein the different successive stages constituting the transcoder device are connected together via bistable flip-flop registers with parallel inputs and outputs, all the registers being connected to a common clock signal generator.

4. An improved binary word processing method for simultaneously adding a large number of words with each of said words being stored in an individual shift register and extracted on the serial output of said register, comprising the steps of
   (1) extracting the least significant bits existing in said registers;
   (2) determining the number of "one's" amongst said extracted bits;
   (3) producing a number of carried "one's" related to the bits of immediately lesser weight wherein said number of carried "one's" is zero when said extracted bits are the least significant bits of said words;
   (4) adding to said determined number the number of carried "one's" relating to the bits of immediately lesser weight;
   (5) calculating the half-sum of said determined number and said carried number;
   (6) entering a "one" into a separate shift register when said half-sum is not a whole number and memorizing a number equal to the whole part of said half-sum;
   (7) extracting said memorized number as the number of carried "one's" for use when calculating the subsequent half-sum; and repeating steps 1 through 7 until the most significant bits of said registers have been extracted and said produced number of carried one's is zero.

5. The improved method of claim 4 wherein p words each comprising n bits are added together using one 16-input transcoder circuit requiring a maximum of $n+r+s$ periods of clock signals, where $2^r \leq p < 2^{r+1}$ and $$s = \log_2\left(\frac{2^{r+1}}{16}\right).$$

* * * * *